US008690156B2

(12) United States Patent
Dusome et al.

(10) Patent No.: US 8,690,156 B2
(45) Date of Patent: Apr. 8, 2014

(54) METHOD FOR PLAYING A CARD GAME

(76) Inventors: Barry Dusome, Hillsdale (CA); Wyatt Dusome, Hillsdale (CA)

(*) Notice: Subject to any disclaimer, the term of this patent is extended or adjusted under 35 U.S.C. 154(b) by 142 days.

(21) Appl. No.: 12/680,231

(22) PCT Filed: Oct. 3, 2008

(86) PCT No.: PCT/CA2008/001735

§ 371 (c)(1), (2), (4) Date: Mar. 26, 2010

(87) PCT Pub. No.: WO2009/043154

PCT Pub. Date: Apr. 9, 2009

(65) Prior Publication Data

US 2011/0001291 A1 Jan. 6, 2011

Related U.S. Application Data

(60) Provisional application No. 60/977,187, filed on Oct. 3, 2007.

(51) Int. Cl.
*A63F 1/00* (2006.01)
*A63F 13/00* (2006.01)

(52) U.S. Cl.
USPC .......... 273/292; 463/13

(58) Field of Classification Search
USPC .......... 273/292, 274, 309; 463/13, 12
See application file for complete search history.

(56) References Cited

U.S. PATENT DOCUMENTS

| | | | | |
|---|---|---|---|---|
| 6,062,565 | A * | 5/2000 | Chadband et al. | 273/292 |
| 6,467,771 | B1 * | 10/2002 | deKeller | 273/274 |
| 2004/0038720 | A1 * | 2/2004 | Valente | 463/11 |
| 2005/0107148 | A1 * | 5/2005 | Webb | 463/13 |
| 2006/0046814 | A1 * | 3/2006 | Hallberg et al. | 463/13 |

* cited by examiner

*Primary Examiner* — Benjamin Layno

(57) ABSTRACT

A method of playing a game that includes a dealer or facilitator. The game consists of allowing players to play a game that comprises at least two sub-games, each sub-game being associated with a pot and being played either simultaneously or sequentially. Each sub-game includes the step of declaring a winning player.

23 Claims, 7 Drawing Sheets

METHOD FOR PLAYING A CARD GAME

RELATED APPLICATIONS

This application is the U.S. National Phase of PCT/CA2008/001735, filed Oct. 3, 2008 and published as WO 2009/043154 on Apr. 9, 2009. This application claims priority to U.S. provisional application 60/977,187, filed Oct. 3, 2007.

FIELD OF THE INVENTION

The present invention relates to a new casino, internet, slot machine or home card game. Specifically the present invention relates to a wagering poker-type game having a new method of play, comprising a multi-player "ring" game played between the players wherein the players split their cards and may play two or more consecutive sub-games as part of the overall game.

BACKGROUND OF THE INVENTION

For many years, gambling and playing table card games, especially poker, have been a traditional pastime and source of enjoyment for many people. Traditional casino games include slot machines, card games such as poker, baccarat, 3-card poker, Caribbean stud, Let it Ride and Texas Hold'em poker etc., dice games and other games. Such traditional games played at a table are a foundation of casino play. Card games are one of the most popular types of table games played at casinos. Prospective casino game players are always looking for new card games that are easy to learn, challenging, exciting and rewarding. Further, casinos and gambling establishments are interested in card games that attract new players, create player loyalty and increase revenues to the casinos and gambling establishments.

Poker is played with a standard deck of playing cards, the cards being ranked (from high to low) Ace, King, Queen, Jack, 10, 9, 8, 7, 6, 5, 4, 3, 2, Ace. (The ace may be considered the "low" card in certain situations). There are four suits (spades, hearts, diamonds and clubs); however, all of the suits are ranked equally, that is to say that no suit has a value higher than the others. In a "standard" poker game, a player must use his available cards to form the highest value five-card hand. The hands are ranked, from highest value to lowest value, as follows: Royal Flush (Straight Flush consisting of 10-Jack-Queen-King-Ace), Straight Flush (All cards in numerical sequence and of the same suit), Four-of-a-kind (Four cards of same value), Full house (Three-of-a-kind and a pair), Flush (All cards of the same suit), Straight (All cards in numerical sequence), Three-of-a-kind, Two Pair, Pair, High Card. If two players each have the same value hand, then the higher-ranked cards in the category wins. For example, a pair of Kings is of higher value than a pair of queens. If players have identically ranked hands (for example, if they each have a pair of aces), then the remaining cards are used to determine the winner. A player with AAK95 defeats a player with AAQ95, by virtue of having a king as a "kicker" which is better than a queen kicker.

In a standard poker game, poker is typically always played using a buy-in system and betting system either ante or blinds or a combination and limit or no limit that is generally universal across most poker games, such as Texas Hold'em, Omaha, Razz, Stud and Draw, to name a few examples. To describe one exemplary game which will be referenced throughout the application, Texas Hold'em poker is played as follows:

1) One player is designated as the dealer. This is done whether the actual player is dealing the cards or whether the dealing is performed by a casino-provided dealer. After every hand, the dealer position rotates clockwise around the table.
2) Players place a buy-in bet. This bet may be in the form of an ante, wherein every player places an equal amount of money into the central pot, and/or in the form of a blind, wherein one or more of the players to the left of the dealer place a sum of money into the central pot as a "blind bet", a bet placed before the player has seen his cards.
3) Players receive their "hole" cards, such cards being hidden from the other players. In Texas Hold'em, the players each receive two facedown cards.
4) Players have one round of betting, such a round beginning with the player to the left of the dealer and proceeding clockwise around the table. The player acting as the dealer is typically considered to be in the best position by virtue of being last to act: he can see how each other player is going to wager before deciding how to represent his hand. The active player may perform one of a number of actions during the betting round: He may "Raise", increasing the wager that each player wishing to remain in the hand must place into the center of the table. He may "Call", matching the wager made by a previous player that is required to remain in the hand. He may "Fold", discarding his hand and refusing to match the wager required to remain in the hand. If the active player is first to act and/or no other player has raised the wager amount, then he may also "Check", declining to raise the amount to be matched but indicating his desire to remain in the hand. This betting round continues around the table until a) players fold such that only one player remains, in which case the remaining player wins the pot; b) one player raises and all other players call or fold. In this case, the betting round is over and the game continues to the following step; or c) all players check, in which case the betting round is over and the game continues to the following step.
5) After the first round of betting, three cards known as "community cards" are dealt face-up by the dealer. This first set of community cards is generally known as the "Flop". The community cards are useable by any player, and will be used at the end of the hand, known as the "showdown", by each player to form a five-card poker hand in combination with the player's "hole" cards.
6) A second round of betting, identical to the first round of betting occurs.
7) A fourth community card is dealt face-up by the dealer. This card is known as the "Turn".
8) A third round of betting, identical to the first round of betting occurs.
9) A fifth, final community card is dealt face-up by the dealer. This card is known as the "River".
10) A fourth, final round of betting occurs. After this round of betting, if more than one player remains in the hand, the last player to raise must show his hand, while other players may show their hand or discard their cards. The player with the highest hand that is shown is awarded the pot.

A number of casino games in which a player is dealt a large initial hand and must split this large, initial hand into two smaller hands to be sequentially played currently exist. One example of such a game is "Pai Gow poker". Pai Gow Poker is a casino table game that is played against the casino, it involves only a single bet which occurs before the cards are dealt. There are no betting rounds as in other types of poker. In Pai Gow Poker, a player is dealt an initial hand of seven cards. The player chooses two cards from this initial seven card hand to form one of the smaller hands, and the remaining five cards form the other smaller hand. In Pai Gow Poker, the hand must be split according to a certain formula: for example, the five card hand must have a higher poker hand ranking than the two card hand. The player's two card hand is scored against the dealer's two card hand, and the player's five card hand is scored against the dealer's five card hand, the winner of each hand winning half of the money bet. As such a card-splitting step adds a level of control over a player's hands that is not present in typically played games such as Texas Hold'Em, a game that incorporates such a step can have a level of excitement and complexity that is not possible in "simpler" poker games. It would be desirable to provide a game that used a system of hand-splitting similar to Pai Gow Poker, but that further allowed a betting system that was more substantially similar to the manner of betting that is used in typical poker games, specifically "community card" games Accordingly, a need exists for a new and unique casino game that meets the needs of the players and gaming houses which is easy to learn and which delivers a new method of play to create an enjoyable method of playing a poker-type game with unique game-play and a finishing hand value that is typically higher than the finishing hand value in a "normal" Texas Hold'em poker hand.

SUMMARY OF THE INVENTION

In one embodiment, the current invention comprises a method of playing a game that includes a dealer or facilitator. The game consists of allowing players to play a game that comprises at least two sub-games, each sub-game being associated with a pot and being played either simultaneously or sequentially. Each sub-game includes the step of declaring a winning player.

In another embodiment, the dealer may play or act in at least one pot associated with one sub-game in such a way that he plays a game against the winning player and wherein the winning player must win against the dealer in order to win the entirety of the pot associated with that sub-game.

The sub-games may be all the same or different, one game might be a card-based game such as poker while another might be another casino-type game or use alternative playing components in lieu of standard playing cards. The sub-games may share elements between each other, that is to say, that playing components of one sub-game, such as community cards dealt face-up for a poker game, may be used in one or more sub-games. In addition the method of determining a winner in each sub-game may be other than rules associated with poker. It may involve scoring points in a manner like cribbage or the taking of tricks as in bridge or euchre. The present invention is not limited to the use of playing cards, the method of declaring a winner of the pot in each sub-game or if the game is played in-situ at a table, on-line, at a video game terminal or against a computer.

In another embodiment, the present invention relates to a new method of playing a poker-type card game in a casino, over the Internet, or at any other location where prospective players might want to play. The game comprises utilizing a standard playing card deck and rules that are generally familiar to any player that is experienced with prior art poker games, but provides a substantially new poker playing experience to the players. Each participant receives an initial hand of playing cards, followed by the steps, splitting the initial hand into two individual hands to be played, playing a game of poker with each of the individual hands, the winner of each of the individual hands being awarded the pot associated with such individual hand.

More particularly, in this embodiment a method of playing a card game is provided comprising the steps of:

(a) allowing a plurality of players to ante at least a first buy-in bet into a first pot and a second buy-in bet associated with a second pot, (b) dealing to each player an initial hand comprising a predetermined number of playing cards;

(c) each player dividing his initial hand into a first hand and a second hand, the first hand consisting of a first predetermined number of cards and corresponding to said first pot and the second hand consisting of a second predetermined number of cards and corresponding to said second pot;

(d) each player allowed to use any community cards that are exposed by the dealer during the rounds to further enhance the value of their hands.

(e) playing a poker game with the first hand to determine a first winning player, and awarding the first winning player the first pot; and (f) playing a poker game with the second hand to determine a second winning player and awarding the second winning player the second pot.

In another embodiment, a dealer is also dealt a "showdown" hand. This showdown hand is a "neutral" hand that is not played by any player, but the winning player of one or more of the individual hands that have been played must have a poker hand ranking that is higher than the showdown hand's ranking in order to receive the entire pot or pots associated with the relevant showdown. For example the game may also include the additional step of dealing a number of cards corresponding to the number of cards in the second hand to a "showdown" hand and comparing the second winning player's hand with the showdown hand, and awarding the second winning player the second pot if the second winning player's hand has a higher poker hand ranking than the showdown hand. Otherwise the pot will be split between the winning player and a "holdover pot" held in trust by the dealer for the winner of the next second round that also beats the "showdown" hand It is understood that the card game of the present invention can be played:

(i) in a casino or other gaming or wagering establishment in a manner similar to conventional card games, i.e. "live table version" wherein a group of players and a casino-provided dealer are positioned at a gaming table.

(ii) on electronic video poker gaming machines located in a casino or other gaming or wagering establishment, (iii) on linked electronic video poker gaming machines located in one or more casino or other gaming or wagering establishment, or (iv) via a handheld electronic device which may be connected to other nearby devices or to a central device which facilitates the playing of the game of the current invention. Examples of appropriate devices include mobile phones and palm computers, along with any mobile electronic devices that may connect to other devices in order to play such a game.

(v) electronically from home through the internet, as allowed by law, (vi) at home with other live players, or (vii) tournament style or single/multiple table action (ring games)

The present invention provides a poker-type game that creates a new "math" and fresh strategies from prior poker games. The present invention also provides a game, which includes an ante system and a betting structure that encourages larger pots. The present invention also provides two or more rounds of play for each dealt hand leading to two or more pots that may be won, and possibly different winners for each pot per dealt hand.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
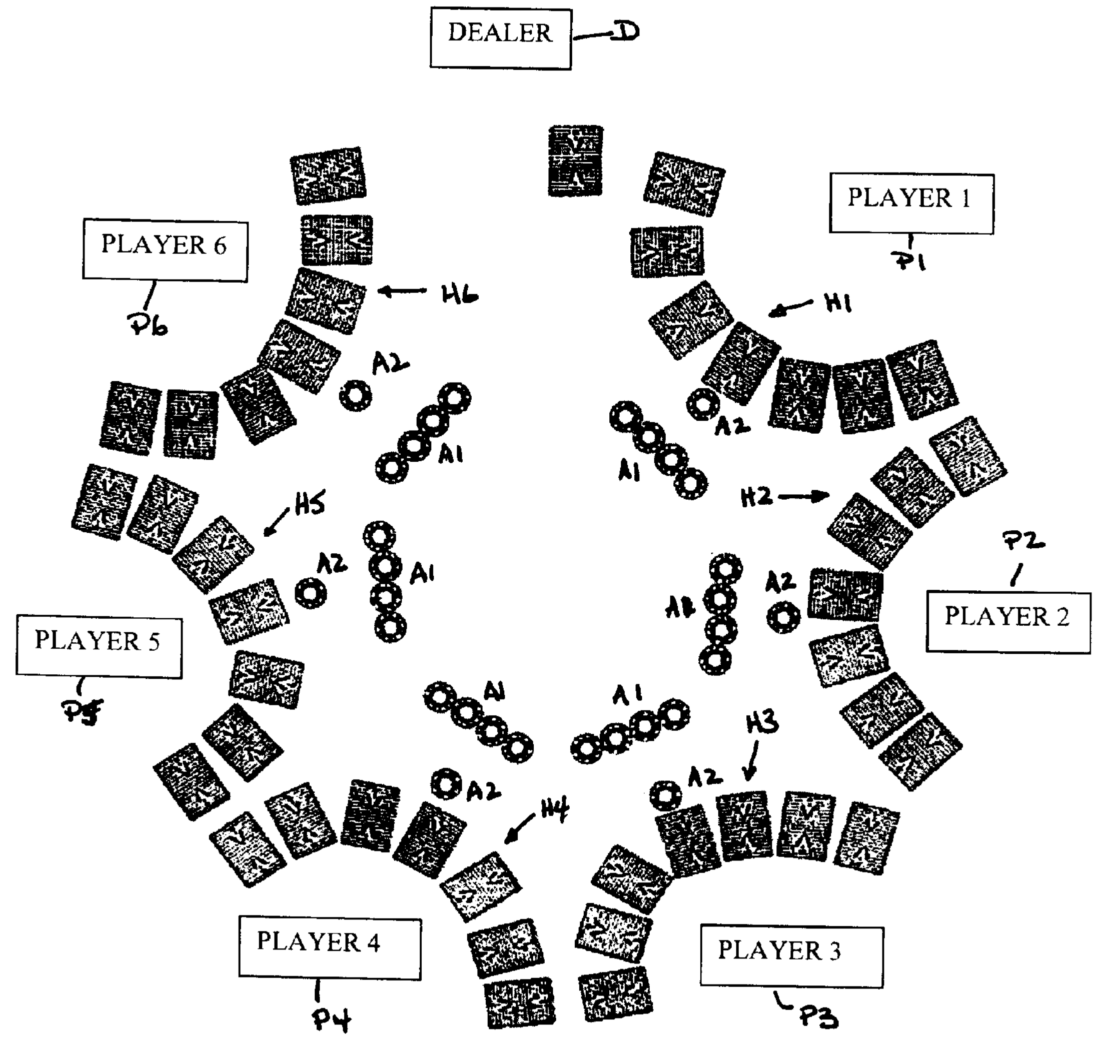
FIG. 1 shows the layout of one embodiment of a game in accordance with the present invention after each player has anted 4 chips for the first hand and 1 chip for the second hand and has been dealt 7 cards.
Figure 2:
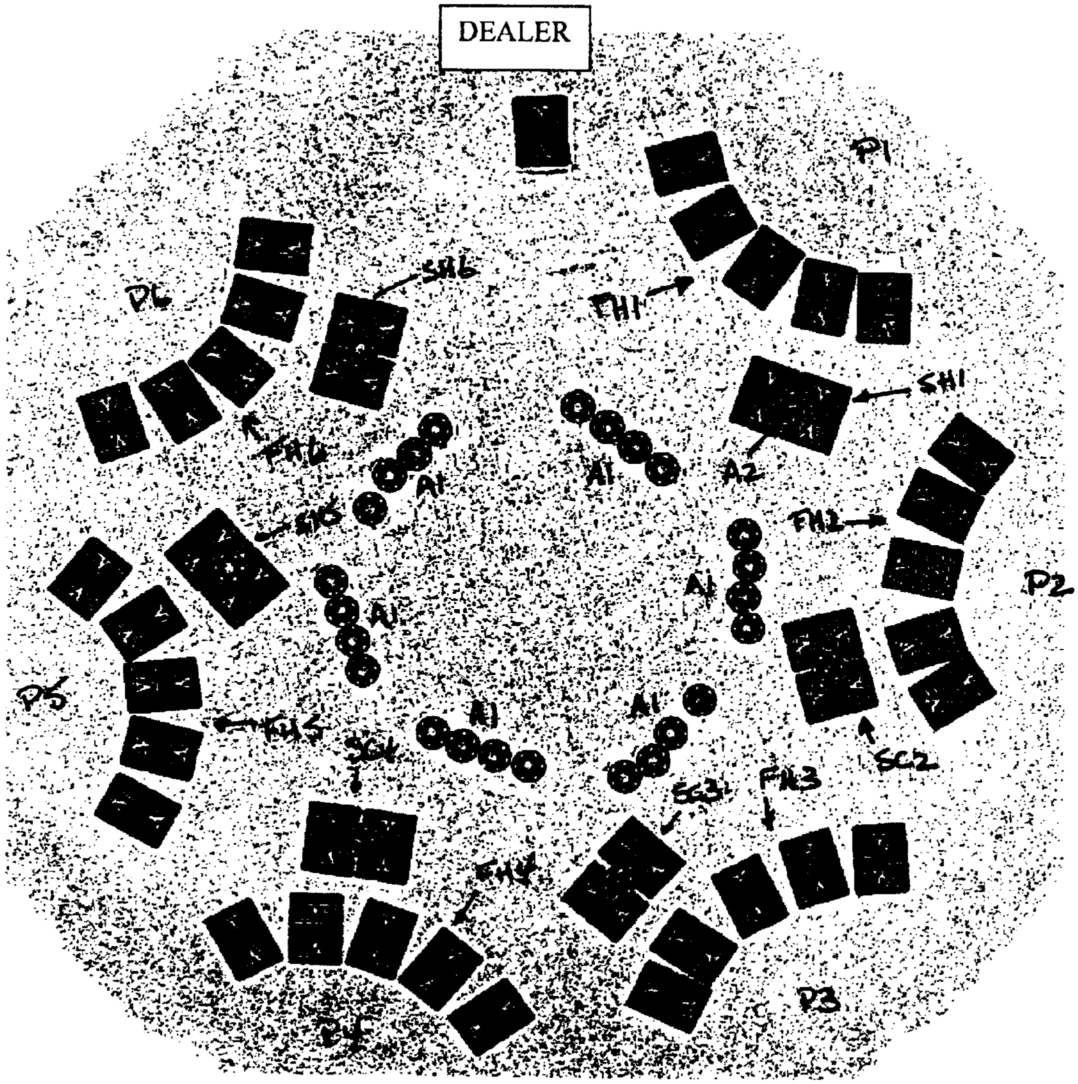
FIG. 2 shows the layout of the game of FIG. 1 without illustrating any betting after the dealer has called for the "split" and each player has placed two cards into a designated spot to be used for the second round and placed their second round ante on top of the two cards.

FIGS. 1-7 illustrate one embodiment of a method of playing a card game in accordance with the present invention utilizing a conventional deck of 52 playing cards. FIG. 1 illustrates the game with six players (P1 to P6) and a dealer (D) however the present invention can be played with a greater or lesser number of players and one of the players can act as the dealer or there can be a separate dealer. Each player "antes" at least a first buy-in bet into a first pot and a second buy-in bet associated with a second pot. FIG. 1. shows that each player has placed two buy-in bets "antes" A1 and A2 onto the table. After all of the players that wish to be included in the hand have placed their buy-in bets, (the first bet to the pot and the second bet by split cards) the dealer deals an initial hand H1 to H6 comprising a predetermined number of playing cards to each player. In FIG. 1 the initial hand is shown as seven cards. As noted above the dealer may be one of the actual players or may be a casino-appointed dealer or even a computer program which acts as a dealer. In each case, the dealer's role is substantially the same. Where one player is designated as the dealer a dealer marking token, called the dealer's button, may be placed in front of such player. As shown in FIG. 2, after the initial hands H1 to H6 have been dealt, instruction is given by the dealer to each player to divide or "split" his initial hand into at least two sub-games, each sub-game being associated with a pot and being played either simultaneously or sequentially. In FIG. 2 the "split" is into a first hand FH1 to FH6 and a second hand SH1 to SH6, the first hand consisting of a first predetermined number of cards and corresponding to a first pot and the second hand consisting of a second predetermined number of cards and corresponding to a second pot. The present invention is not restricted to the "split" into two hands. In FIG. 2 the initial hand of seven cards is "split" by each player choosing five cards from his initial hand H1 to H6 to form the first hand FH1 to FH6 and choosing two cards to form the second hand SH1 to SH6. The first hand FH1-FH6 of five cards is kept by the player to be played in one sub-game, while the second hand SH1-SH6 is placed face-down in front of each player and somehow designated as a hand that is to be played in another sub-game. Such a designation may be in the form of placing a special marker or token on top of the facedown second hand, or may be in the form of a designated area on the playing surface in front of each player which "holds" the second hand until it is to be used. This second hand will be used for the second round of play that arises from the initially dealt hand. A second buy-in bet, typically in the form of an ante bet A2 that may be of any size as deemed appropriate by the gaming house or agreed-to by the players, but in one embodiment being 25 percent of the size of first buy in bet A1, is placed on or near the cards.

Figure 3:
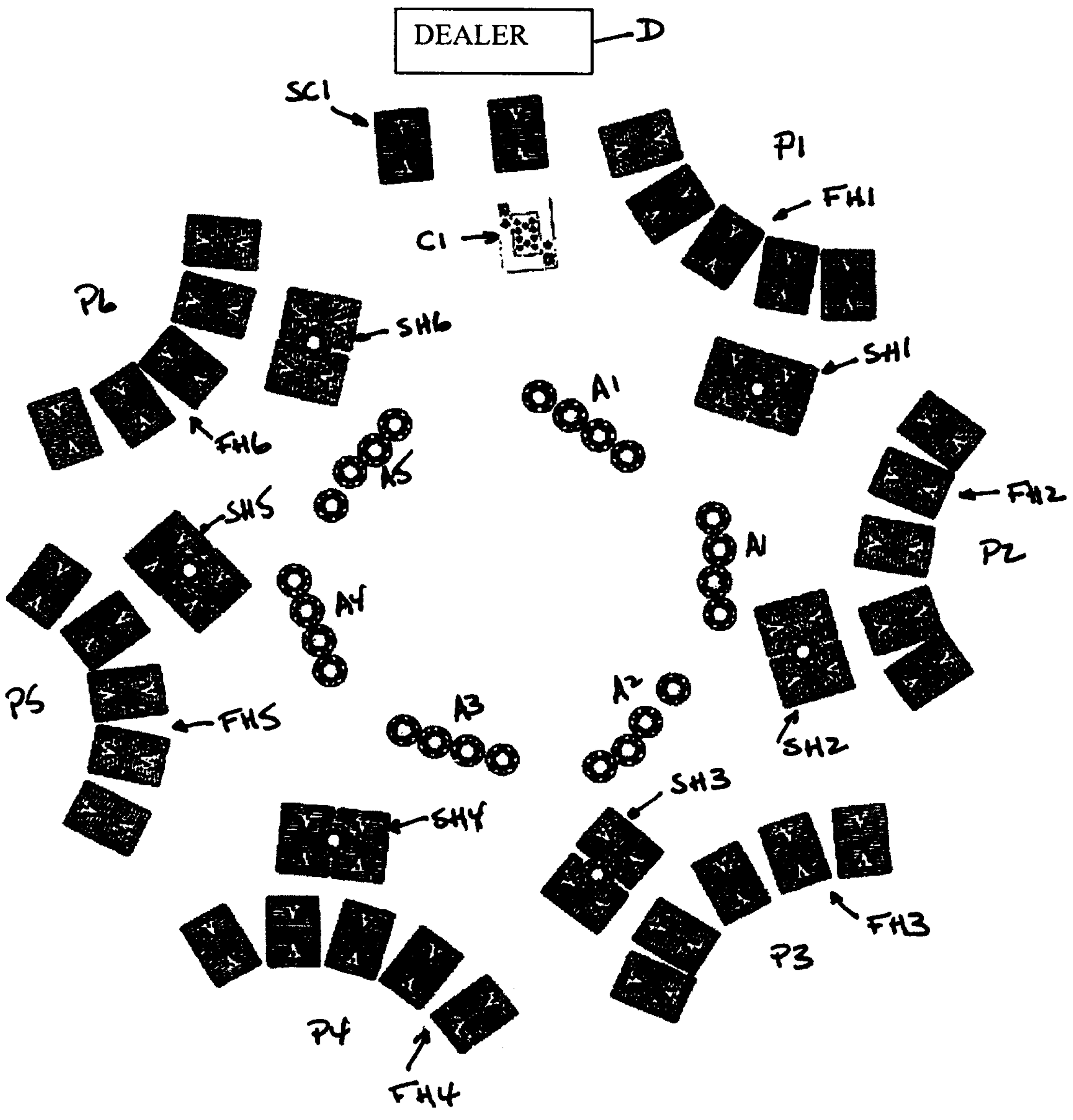
FIG. 3 shows the layout of the game of FIG. 2 without illustrating any betting after the dealer has dealt one card to the showdown hand (located at the dealer's right, remaining cards in the deck are located on dealer's left) and has turned over one community card in the center of the table (the Turn).
Figure 4:
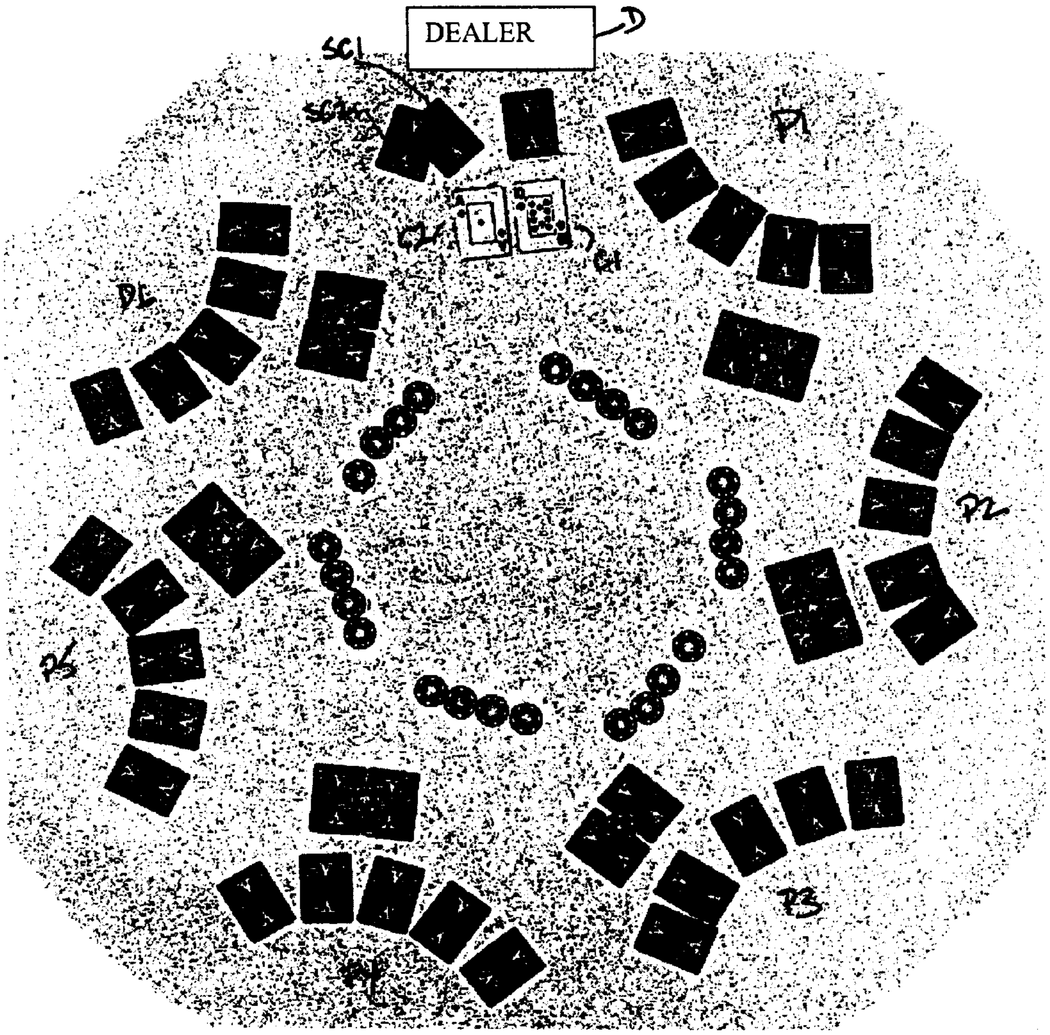
FIG. 4 shows the layout of the game of FIG. 3 without illustrating any betting after the dealer has dealt a second card to the "showdown" hand and has turned over the second community card to the board, (the River).
Figure 5:
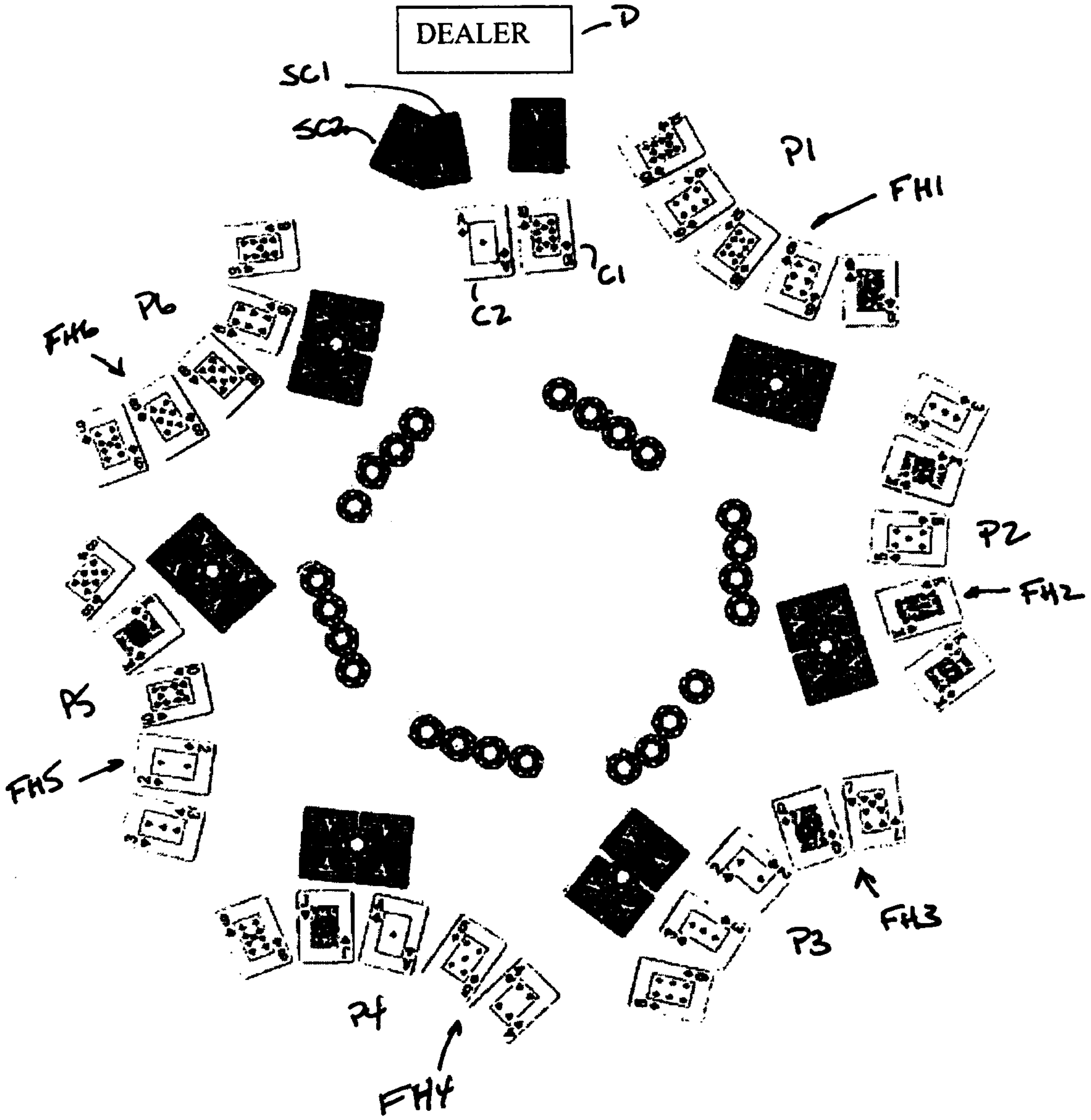
FIG. 5 shows the layout of the game of FIG. 4 without illustrating any betting after the cards have been shown and the player to the dealer's left has shown the highest ranking poker hand (consisting of a full house with three tens and a pair of 6s), and before the winner takes down the first pot.

As shown in FIG. 3-5, after the hand splitting phase and ante-posting phases are complete, the five-card, first hand is played in a first sub-game. This is the first "round" of the two-round game in the embodiment illustrated played between the players every time players are dealt a set of cards.

To start the first sub-game a first betting round occurs. Such a round typically begins with the player P1 to the left of the dealer D and proceeds clockwise around the table. The active player may perform one of a number of actions during the betting round: He may "Raise", increasing the wager that each player wishing to remain in the hand must place into the center of the table. He may "Call", matching the wager made by a previous player that is required to remain in the hand. He may "Fold", discarding his hand and refusing to match the wager required to remain in the hand. If the active player is first to act and/or no other player has raised the wager amount, then he may also "Check", declining to raise the amount to be matched but indicating his desire to remain in the hand. This betting round continues around the table until a) players fold such that only one player remains, in which case the remaining player wins the pot and the second round begins with the winner of the first round starting the betting action b) one player raises and all other players call or fold. In this case, the betting round is over and the game continues to the following step; or c) all players check, in which case the betting round is over and the game continues to the following step.

If two or more players are still in the hand then the dealer will take one card known as a "showdown card" SC1 and place it facedown in the designated area for the dealer's "showdown hand", and the remaining players will see a first community card C1 known as the "turn card" dealt by the dealer into the designated community card area face up, and available to each of the players to build their best poker hand.

Another round of betting, identical to the first round, takes place with the remaining players. After this second betting round, if there are any remaining players, as shown in FIG. 4, the dealer will place a second card SC2 facedown in the area designated for the dealer's "showdown hand" and turn over face up a second community card C2 known as the "river card" to be used by each player if desired.

A third round of betting takes place, at the end of which any remaining players must "showdown". As shown in FIG. 5 Each of the players may use their five "hole" cards FH1-FH6 that were split during the hand splitting phase of the game in combination with the two face-up community cards C1,C2 to form the best possible five card poker hand. If more than one player remains in the hand after betting has ended, the last player to raise the pot must show his or her hand, and the players after him may either fold or show their hand in clockwise order. The player that shows the best five-card poker hand wins the first pot. Should all players but one fold, the remaining winning player may either fold his hand without showing it or show it, at his discretion.

Figure 6:
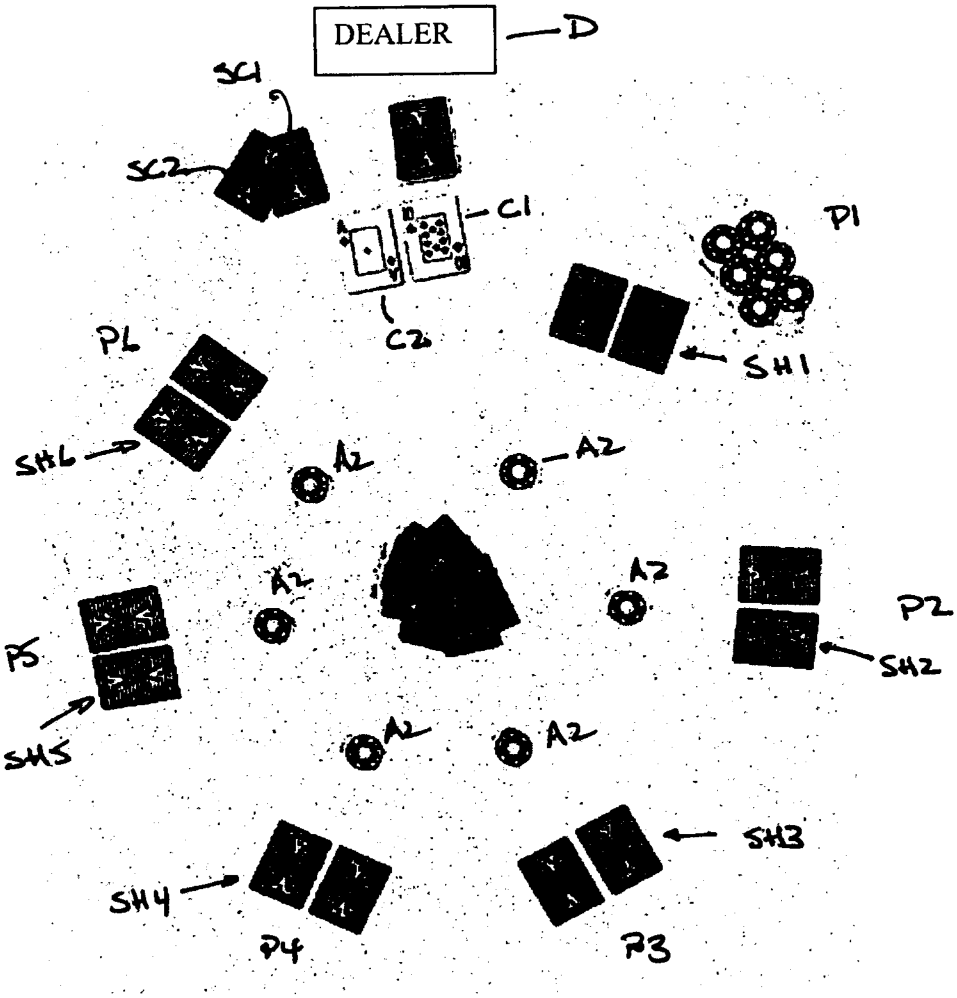
FIG. 6 shows the layout of the game of FIG. 4 without illustrating any betting after the winner of the first hand has taken the pot, the first hand has been discarded, and the players have anted their second bet into the pot and taken up the second card hand.

As shown in FIG. 6, at the end of the first sub-game or "high hand", all players discard their first split hand FH1-FH6 and pick up their second, two-card hand SH1-SH6 to begin the second round of play or sub-game, for which an ante A2 has already been posted. The previously exposed community cards C1, C2 are kept face-up on the table, and will again be used as community cards for the second round of play. The winner of the first round starts the second round with a round of betting using his two hidden cards and any cards turned or exposed by the dealer to form a poker hand.

Figure 7:
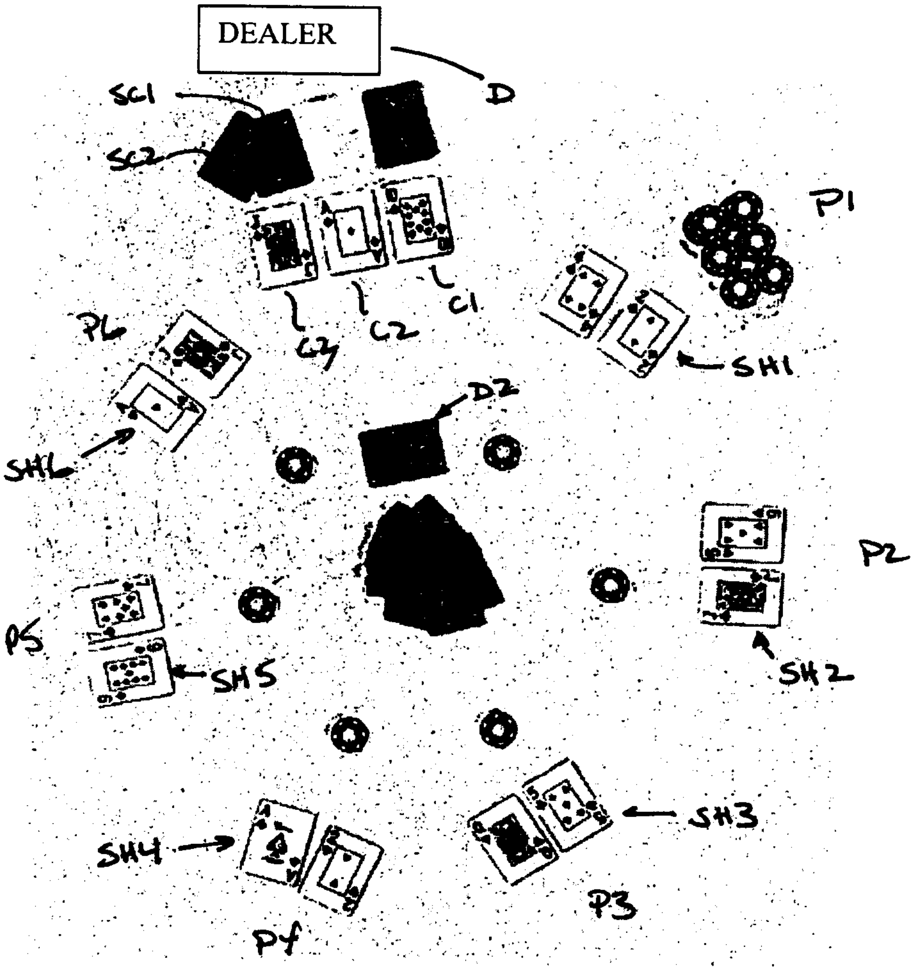
FIG. 7 shows the layout of the game of FIG. 6 without illustrating any betting after the dealer has discarded a card and exposed a third community card, (the "Hammer card").

After this first betting round, as shown in FIG. 7 if any players remain, the dealer will turn over a third community card C3, known as the "hammer card", to be used by the players. In one embodiment, a card D2 may be discarded by the dealer at this stage, prior to the turning over of the last community card, such a card being known as the "burn" card.

A final betting round occurs, after which the last player to raise the pot must show his or her hand, and the players after him may either fold their hand or show their hand in clockwise order. The players each use their two hole cards SH1-SH6 and the three face-up community cards C1,C2,C3 to form a five-card poker hand. The player with the highest poker hand is the winner. If, at any point in time during the second round of play only one player remains, he also becomes the winner. The winner of the second round must expose his hand and "showdown" with the "showdown hand" being the two hole cards SC1,SC2 (which were dealt to the dealer throughout the five-card and/or two-card hand as the community cards were exposed). If the dealer's "showdown" five card poker hand, consisting of the two hole cards SC1, SC2 and the three community cards C1,C2,C3 either ties or beats the player's winning hand then the second pot is split between the winning player and a "holdover" pot. The dealer places half of the pot in a designated area, to be added to the pot of the next second round. By adding a potentially large amount of money to the pot in such a manner, an incentive may be given to the players to "stack" or "load up" in the second round and to adjust their card-splitting strategy to better compete in the second round. After a round is played, the cards are collected, shuffled and another hand is dealt. Where one of the players is acting as the dealer, the dealer button is rotated in a clockwise manner rotation, and the game continues as above. If the community cards C1,C2 were not dealt in the first round because a winner was declared prior to the step that comprises their being dealt-out, then the second round will begin immediately with a betting round started by the winner of the first round "High Hand" using the second round split cards SH1-SH6 and any exposed community cards, any other of the unexposed community cards C1, C2, C3 and undealt showdown cards SC1, SC2 should be introduced one at a time, during the second round with a betting round after each community card is introduced, with the second round occurring normally. If a second round winner is declared before all of the community cards C1,C2,C3, have been exposed, the dealer may immediately deal-out the community cards in the same manner without the betting rounds and proceed with the showdown with the winning player.

In live or online casino poker games, casino revenues are traditionally made by charging players a flat hourly fee or by charging a "rake", a percentage of each pot. Such a rake may amount to a substantial amount of money, sometimes up to 5 or 10 percent of each and every pot that is won. An alternate embodiment of the game of the current invention is provided wherein no "rake" is taken from every hand. In this case, the current game's "dealer showdown" system may be used to generate revenue. If the winner of the second round does not defeat the dealer, a portion of the pot is split and placed in a designated area. Once the dealer has won a certain number of pots, the dealer can take the entirety of the designated pot and remove it from play, generating revenue for the gaming house. The exact number of pots could vary based on the number of players. In one embodiment of the current invention the dealer or "house" could take down the sub-game pot in the following manner: In a game with 2-3 players, the sub-game pot could be taken by the house after 5 consecutive showdown hands were won by the dealer. In a game with 3-4 players, the sub-game pot could be taken down by the house after 4 consecutive wins. With 5-6 players, the dealer may take down the pot after only 3 consecutive wins. Alternatively the house could take down the pot after winning 7 out of 21 hands. A casino or gaming house will be able to set their own rake formulas, as allowed by law and in a manner that is currently known in order to ensure an appropriate level of income. This method of profit-making adds a great deal of excitement to the game, because a large pot will be generated that the players must actively attempt to win before it is withdrawn from play by the house. It places a turn constraint on the players, and encourages them to play with deeper strategy as the pot becomes larger before the dealer can take down the pot.

The method of play of the present invention also allows additional bets per deal in comparison to some known poker games such as Texas Hold'em and Omaha. In the aforementioned seven-card embodiment of the present invention, there are up to five betting rounds per hand dealt, with a minimum 2 betting rounds and a "showdown". In a typical Texas Hold'em hand, there are only up to four betting rounds, if it makes it past the first betting round. The method of play of the present invention further allows the possibility for all betting rounds to occur, even if the sub-game with the first split hand FH1-FH6 ends before the betting rounds associated with it are complete by transferring the balance of the betting rounds to the second sub-game involving the split hand SH1-SH6 round.

Although the current description makes no specific mention of the betting structure of the method of play of the present invention, it is known that the betting structure of such a game may be of any type, including limit, pot limit, no limit, or otherwise. In a limit betting game, players may only bet specific amounts at each betting round. In a pot limit betting game, players may bet any amount (above a minimum limit) up to the total value of the pot. In a no-limit game, players may bet any amount above a minimum limit up to the total amount that they have on the table.

In one alternate embodiment of a method of play according to the present invention, the buy-in bet A1,A2 may be in the form of blinds posted by one or more players to the left of the dealer. These blinds are in the form of "active bets" placed by the player P1 immediately next to the dealer before looking at their cards, which may encourage the players to play with meager card holdings in comparison to an ante system. In yet another embodiment a combination of "blind" and "ante" bets in different ratios may be used Another embodiment of the method of playing a game that allows players to play a game that comprises at least two sub-games, each sub-game being associated with a pot and being played either simultaneously or sequentially according to the present invention, which may be entitled "6-Card High Hand Hold-Em", can be based on the dealing of six initial cards as follows:

Opening: Each player antes a bet for each of the minimum of two sub-games two which may be respectively called the "high hand" and the "burn round"

First Sub-game or "high hand" round:

1. 6-cards are dealt to each player with the players splitting off 2 cards for the second sub-game round.
2. A first betting round (check, call, raise or fold) with the 4 cards held in the "high hand" occurs in the normal manner.
3. Optionally, the Dealer may take a card and deliver it to the third showdown hand in the event that such around is to be played. The Dealer may set aside cards for a showdown hand for this optional third round to be played between the winner of the second round and the showdown at any stage in the game, but usually before the exposing of a community card. However, the dealer showdown hand should eventually receive for this third round the same number of cards as each player has split-off for the second round.
4. The Dealer then exposes the first community card which may be called the "come-along" card.
5. A second betting round occurs in the usual manner.
6. The Dealer may optionally deliver a second card to the "showdown hand".
7. The Dealer exposes a second community card which may be called the "turn" card.
8. A third betting round occurs in the usual manner.
9. The Dealer may optionally "burn" discard a card (not used in game) to the muck.
10. The Dealer exposes a third community card which may be called the "river" card.
11. A fourth and final betting round occurs in the usual manner.
12. A showdown of cards occurs between the remaining players to determine the winner. Players make their best 5 card poker hand from any combination of "in-hand" or "hole" cards and "on board" or exposed community cards. The Winner takes the first sub-game pot in the normal manner and does not have to show his/her hand if he/she is not "called".

Second sub-game: the "split" round. After the Winner of the first sub-game takes the first pot then all players ante for the second sub-game round and pick up their respective two hole cards that they split from the original hand.

13. The Winner of "high hand" starts the first betting round with two hole cards and any exposed community cards on the "board". If someone has won the high hand before all community cards are exposed, then the players ante the second ante and the second sub-game continues with the winner starting the "action", being the first to bet. The second round starts immediately after the "high hand" has been won even if no cards are yet exposed as community cards, with the winner of the high hand starting a round of betting with the second round cards and, if any, the exposed community cards already "on the board".
14. The Dealer may optionally burn (discards) another card.
15. The Dealer exposes a fourth community card which may be called the "hammer" card. A total of four community cards must eventually be exposed by the conclusion of the second round.
16. A final betting round occurs.
17. A showdown of cards occurs amongst the remaining players to determine the winner. Players make their best 5 card poker hand from any combination of "in-hand" or "hole" cards and "on board" or exposed community cards. The Winner takes the second sub-game pot in the normal manner and does not have to show his/her hand if he/she is not "called" if there is no third sub-game showdown round.

Optional third sub-game: "showdown" round. The Dealer ensures that the showdown hand has been dealt enough cards to have the same number of cards as the players had for the second round.

18. The Winner of the second sub-game has a showdown of cards with the dealer showdown hand to determine the pot split. The winner is declared by the best 5 card poker hand made up from any combination of "in-hand" or "hole" cards and "on board" or exposed community cards.
19. The Winner takes all of pot if he beats the showdown hand but only ½ of pot if the showdown hand either ties or beats the winner.
20. The dealer then reserves ½ the pot to be dedicated to a further pot in a subsequent sub-game to be played, but preferably for the next second sub-game.
21. Thereafter, the cards are shuffled, the dealer button is rotated and another hand is dealt.

In another embodiment of the invention, the cards cannot be looked at until after the dealer has called for the "split" and once split, only the cards in the hand that is being "actively played" may be looked at. That is to say, in the mentioned seven-card embodiment, the two-card second hand may not be looked at after the split until the second hand is being played.

In a further embodiment of the invention, each player may be dealt an alternate number of cards, preferably five cards. Such a five-card hand may be split into a two card hand and a three card hand. The game occurs in a manner similar to the seven-card embodiment, preferably as follows:

Each player places an ante and/or blind buy-in bets into the pot and is dealt five cards and splits the cards into a three card hand and a two card hand. A second ante and or blind bet is placed by each player on top of the two card hand, the "hold" to be used in a second pot corresponding to the second round and the three card hand "high hand" is taken up. After the first hand is taken up, a first round of betting occurs. The dealer then deals a card facedown for the "showdown" hand and deals two community cards face up (these cards are known as the flop, or "shotgun"), and allows another round of betting. A further card is dealt to the "showdown" hand, another community card is dealt face up (known as the turn), and another round of betting occurs. A card is "burned" (discarded) to the muck and a final community card for this hand is dealt (the river), after which another round of betting occurs. The player with the best five-card poker hand formed from his three cards and the four community cards is awarded the first pot. The winner of the first hand is then first to act in the second hand. All hands are discarded, the players ante their second buy-in bet to the pot and pick up their two card hand. A round of betting occurs and the dealer "burns" (discards) another card and deals a final community card (known as the "hammer"

card) faceup. One final round of betting then occurs and the player with the best five card poker hand formed from his two cards and the five community cards (the community cards from the first and second rounds of play) is awarded the second pot. In order to win the entirety of the second pot, the second winning player must have a poker hand with a poker hand ranking that is higher than the poker hand ranking of a "showdown hand" that is dealt to the dealer. If the dealer's showdown five card poker hand, ties with or beats the player's winning hand then the pot may be split between the winning player and the hold over pot, the dealer holding some or all of the money in the pot to be added to the second round pot in a later gaming round.

It is to be understood by one of ordinary skill in the art that the present discussion is a description of exemplary embodiments only, and is not intended to limit the broader aspects of the present invention.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are as follows:

1. A method of playing a wagering poker card game on a computer device configured to display images of playing cards on a display screen; providing a non-transitory computer readable medium coded with instructions comprising: a processor for executing a set of programmable instructions for playing the card game; a display in operative communication with said processor; and input means in operative communication with said processor for receiving at least one input from a player during play of the card game; wherein the card game and representation of a 52 card playing deck stored thereon entails the processor to perform the steps comprising the steps of:

a) providing card game apparatus including at least one physical deck of standard playing cards and a "dealer "and allowing a plurality of players to ante at least a first buy-in bet into a first pot and a second buy-in bet into a second pot upon commencement of the second poker game;

b) shuffling the physical random number generator playing cards into a new order and the dealer dealing to each player an initial hand comprising a predetermined number of playing cards;

c) each player dividing his initial hand into a first hand and a second hand, the first hand consisting of a first predetermined number of playing cards and corresponding to said first pot and the second hand consisting of a second predetermined number of playing cards and corresponding to said second pot;

d) the players playing a first poker game with the first hand, the winner of said first poker game being awarded the first pot;

e) the players playing a second poker game with the second hand, the winner of said second poker game being awarded a first portion of said second pot;

f) throughout betting rounds during the first and second poker games disclosing three or more community cards to be used by each player over the two hands and dealing a number of playing cards, before revealing a community card, corresponding to the number of playing cards in the second hand to a showdown hand;

g) if a winner is declared in the first poker game before a prescribed number of community cards are exposed or betting rounds completed then the remaining community cards and associated betting rounds are transferred to the second poker game;

h) if a winner is declared in the second poker game before revealing all the community cards, the dealer will proceed to create the showdown hand and reveal any further community cards with no associated betting rounds i) then after playing the second poker game comparing the winning player's hand of the second poker game together with the community cards with the showdown hand together with the community cards, and awarding the second winning player the remaining portion of the second pot if the winning player's hand of the second poker game has a higher poker hand ranking than the showdown hand and wherein the portion of the second pot not won by the winner of the second game in a showdown hand is allocated to a showdown pot of a further game played thereafter.

2. A method of playing a card game according to claim 1 wherein the initial hand consists of seven cards.

3. A method of playing a card game as in claim 2 wherein the first hand consists of five cards and the second hand consists of two cards.

4. A method of playing a card game according to claim 1 wherein the first buy-in bet is at least twice as large as the second buy-in bet.

5. A method of playing a card game according to claim 1 wherein the first buy-in bet is four times larger than the second buy-in bet.

6. A method of playing a card game according to claim 1 wherein the step of praying a poker game with the first hand to determine a first winning player comprises at least the sequential steps of:

a) playing through a first betting round, and if there is no winner b) dealing one playing card to the showdown hand then disclosing at least one community card, and c) playing through a second betting round, and if there is no winner d) dealing a second playing card to the showdown hand then disclosing at least one further community card, and e) playing through a third betting round, to provide each player with an individual first hand of cards and up to two community cards, each player forming a first poker hand having a predetermined number of cards by using said player's individual first hand of cards and any community cards available, declaring the player having the poker hand with the highest poker hand ranking as the first winning player, and awarding the winner the first pot.

7. A method of playing a poker game according to claim 1 wherein the step of playing a poker game with the second hand to determine the second winning player comprises at least the sequential steps of:

a) playing through a first betting round, and if there is no winner b) disclosing at least one community card, and c) playing through at least a second betting round, thereby to provide each player with an individual second hand of cards and at least one more community card, each player forming a second poker hand having a predetermined number of cards by using said player's individual second hand of cards and the community cards, and declaring the player having the poker hand with the highest poker hand ranking as the second winning player.

8. A method of playing a card game as in claim 7 wherein the community cards used to form the second poker hand comprise the community cards disclosed during the step of playing a first poker game and the step of playing a second poker game.

9. A method of playing a card game as in claim 8 wherein the initial hand consists of five cards.

10. A method of playing a card game as in claim 9 wherein the first hand to be played consists of three cards and the second hand to be played consists of two cards.

11. A method of playing a card game as in claim 8 wherein up to four community cards are provided with which the players may form the first poker hand and wherein five community cards are provided with which the players may form the second poker hand.

12. A method of playing a card game as in claim 8 wherein at least one card is dealt facedown to a showdown hand prior to any of the steps which comprise disclosing a community card, and wherein said showdown hand comprises at least said card.

13. A method of playing a card game as in claim 8 wherein the initial a number of cards dealt in the initial hand consists of 6 cards.

14. A method of playing a card game as in claim 13 wherein on being dealt six cards the players divide their cards to provide 4 cards for the first sub-game and a second hand of 2 cards for the second sub-game.

15. A method of playing a card game as in claim 14 wherein up to three community cards may be provided in the first sub-game with which the players may form their first hand and wherein four community cards are provided in the second game with which the players may form their second hand.

16. A method of playing a card game according to claim 13 where the dealer deals a number of cards equal to the number of cards in the second round to a "showdown " hand and further comparing the winner of the 2nd round with the showdown hand and awarding the entire pot if the player beats the showdown hand and awarding less than the entire pot to the winner of the second round if the showdown hand ties or defeats the winner of the second round.

17. A method of playing a card game as in claim 7 wherein the initial number of cards dealt in the first sub-game consists of 7 cards.

18. A method of playing a card game as in claim 17 wherein on being dealt seven cards the players divide their cards to provide 4 cards for the first sub-game and a second hand of 3 cards for the second sub-game.

19. A method of playing a card game as in claim 17 wherein up to three community cards are provided in the first sub-game with which the players may form their first hand and wherein four community cards are provided in the second game with which the players may form their second hand.

20. A method of playing a card game as in claim 7 wherein the second sub-game starts immediately after the first sub-game has been won and the winner of the first sub-game starts the betting with the second sub-game hand and any exposed community cards, the community cards and betting rounds from the first round being transferred to the second round with betting rounds between each exposed card.

21. A method of playing a card game according to claim 1 whereby at least one joker or wild card is added to the standard deck of 52 cards to be used to represent any card (value and suit) in the deck.

22. The computer device of claim 1 wherein the computer device is selected from the group consisting of a personal computing device, such as a PDA, cellular telephone, mobile electronic device and a casino-type gaming machine.

23. A method as in claim 22 where the computer device is operated wirelessly over the internet to connect a group of players virtually.

* * * * *